A. M. CHASE.
MOTOR LAND IMPLEMENT.
APPLICATION FILED OCT. 2, 1909.
1,113,101.
Patented Oct. 6, 1914.
2 SHEETS—SHEET 1.
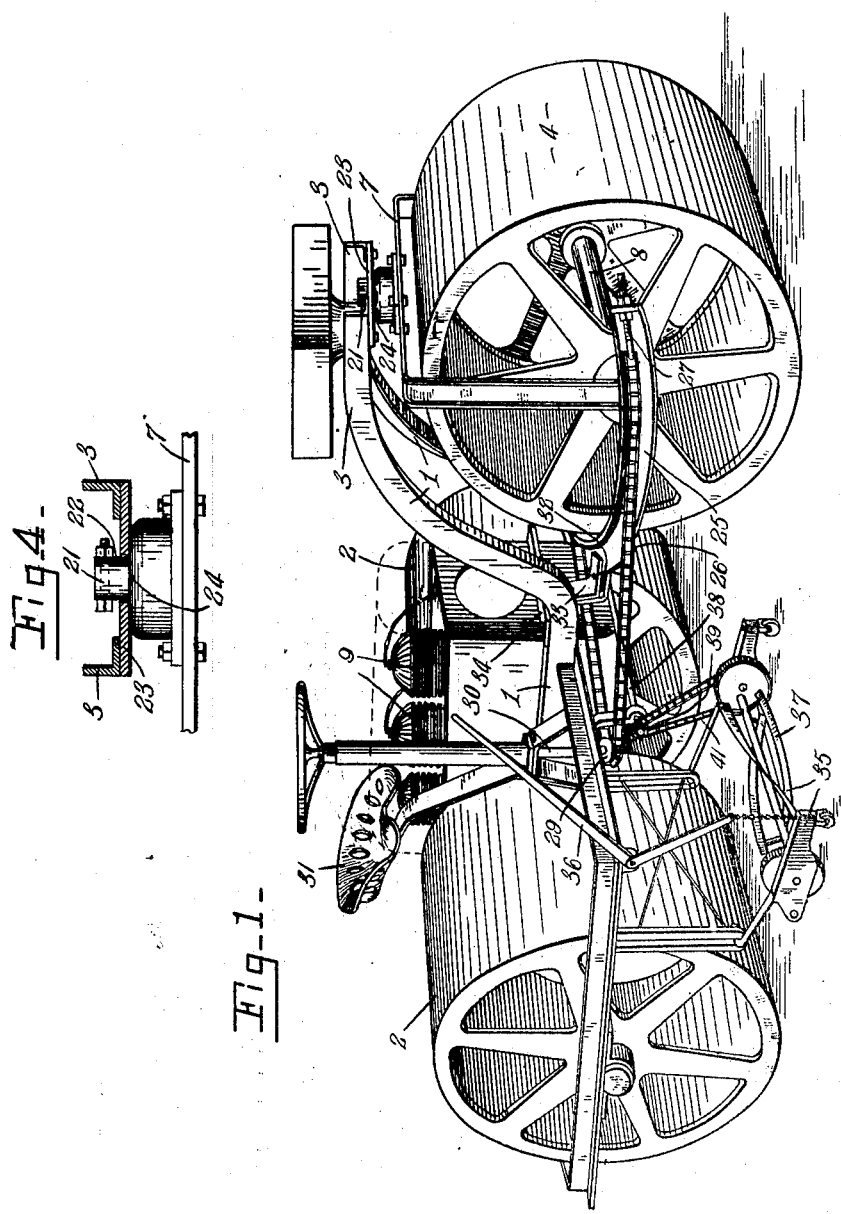
WITNESSES:
Chas. H. Hughes.
Chas. H. Young.
INVENTOR.
Aurin M. Chase
BY
Parsons, Hall & Bodell
ATTORNEYS.

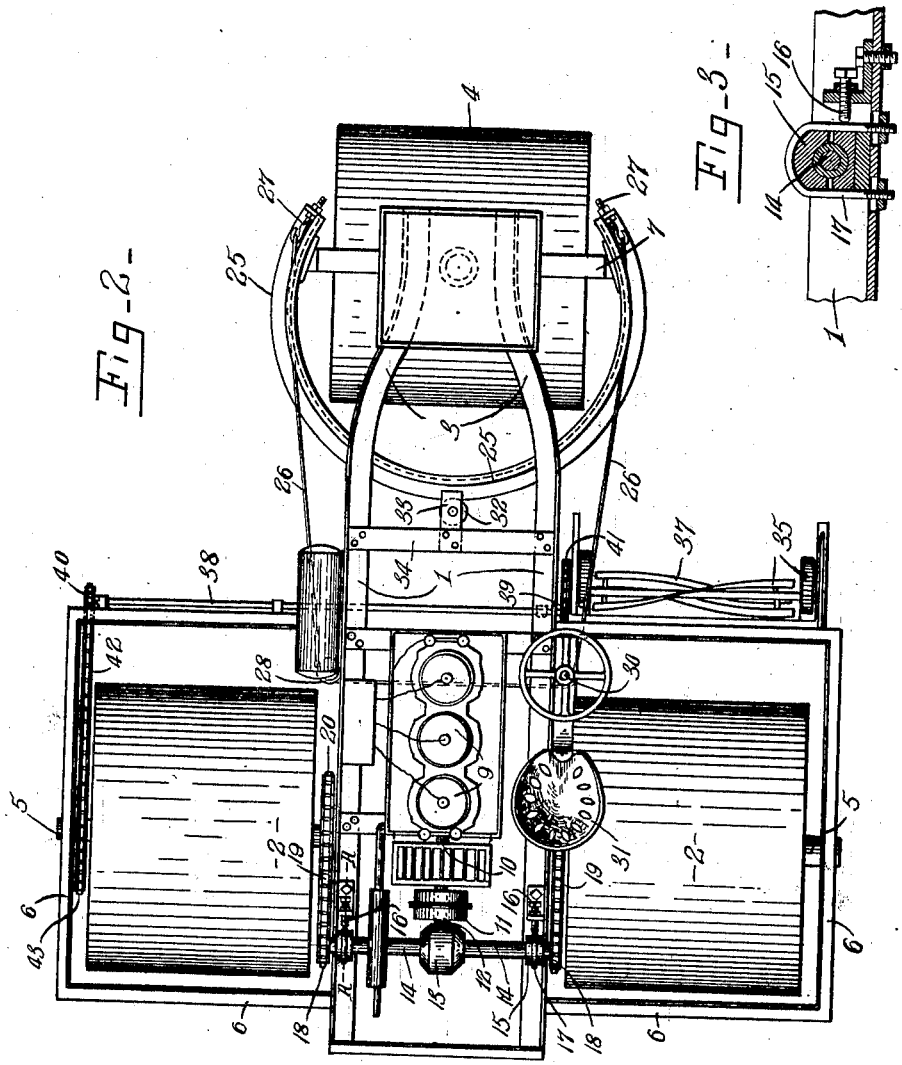

UNITED STATES PATENT OFFICE.

AURIN M. CHASE, OF SYRACUSE, NEW YORK, ASSIGNOR TO CHASE MOTOR TRUCK COMPANY, OF SYRACUSE, NEW YORK, A CORPORATION OF NEW YORK.

MOTOR LAND IMPLEMENT.

1,113,101.

Specification of Letters Patent. Patented Oct. 6, 1914.

Application filed October 2, 1909. Serial No. 520,665.

*To all whom it may concern:*

Be it known that I, AURIN M. CHASE, of Syracuse, in the county of Onondaga and State of New York, have invented a certain new and useful Motor Land Implement, of which the following is a specification.

My invention has for its object the production of a motor land roller suitable to be used as a roller only, or in connection with other implements, as mowers, etc., and it consists in the combinations and constructions hereinafter set forth and claimed.

In describing this invention reference is had to the accompanying drawing in which like characters designate corresponding parts in all the views.

Figures 1 and 2 are, respectively, perspective and plan views of my land roller. Fig. 3 is a sectional view on line A—A, Fig. 2. Fig. 4 is a fragmentary view, partly in section, illustrating the connection between the fork for the steering roller and the contiguous part of the frame.

This motor land roller comprises, generally, a frame, driving rollers, a steering roller, and a motor. Preferably the driving rollers are arranged in axial alinement and with their opposing ends spaced apart, and the steering roller is disposed in front of the space between the ends of the driving rollers, and the motor is supported by the frame between the ends of said driving rollers.

As here shown the frame comprises main elements or bars 1 (usually two in number) extending between the driving rollers 2, and having forward extensions 3 which rise over the steering roller 4, the bars 1 being provided with bearings for the opposing ends of the axles 5 of the rollers 2; and said frame also comprises elements 6 extending laterally from the rear portions of the bars 1 and inclosing the driving rollers 2, these elements 6 being provided with bearings for the outer ends of the axles 5 of the driving rollers 2. The frame also comprises a suitable fork 7 carried by the forward extensions 3 of the main bars 1, this fork straddling the front or steering roller and supporting the axle 8 thereof.

The motor or engine 9 is supported by the main bars 1 of the frame between the driving rollers 2, and the crank shaft 10 thereof extends crosswise of the axes of the rollers 2 and is connected to a transmission gearing located within a suitable case 11. This gearing is connected by a shaft 12 to a power-transmitting element comprising a suitable differential gearing located within a case 13, and shafts 14 which are arranged in axial alinement, are journaled in bearings 15 at the rear of the axles 5 for the driving rollers 2 and extend parallel to such axles.

The bearings 15 are mounted on the frame bars 1, are preferably adjustable lengthwise of such bars by screws 16, Fig. 2 and 3, and are secured in their adjusted position by clamping bolts 17. These shafts 14 are connected at their inner ends to gears of the differential gearing and carry at their outer ends pulleys or sprocket wheels 18 which are connected by belts or sprocket chains 19 to pulleys or sprocket wheels 20 mounted on the inner or opposing ends of the axles 5, the belts or chains 19 extending forwardly from the pulleys or sprocket wheels 18 at opposite sides of the motor and between the outer sides of the main bars 1 and the inner ends of the driving rollers 2.

The fork 7 is suitably connected to the front end of the extensions 3 of the main bars 1, being here shown, Fig. 4, as provided with an upright stud or pivot 21 loosely fitting in an opening 22 in a plate 23 fixed to the extensions 3, and as also provided with a convex bearing surface 24 at the base of the pivot 21 for engaging the underface of the plate 23. Thus the fork 7 can swivel or turn about the axis of the pivot 21 and can also move to a limited extent at an angle to its pivotal movement, permitting the axle for the steering roller to tilt out of a horizontal plane when said roller is passing over uneven ground.

A suitable sector or track 25 is supported by the fork and is arranged concentric with the axis of the pivot 21 and in the horizontal plane of the axle 8 of the steering roller 4. The ends of a suitable cable 26 are connected to the opposite ends of the sector or track 25 by adjustable links or bolts 27, this cable 26 extending around an idler 28 carried by the frame and around a pulley 29 on the lower end of a steering post 30 which is supported by the frame in front of one of the driving rollers 2. A seat 31 for the operator is preferably supported over the driving roller 2 at the rear of the steering post 30.

An antifriction member or roller 32 engages the rear surface of the intermediate portion of the sector or track 25 and thus facilitates the forward movement of the steering roller and steadies the same during the swiveling of the fork 7. Said roller 32 is carried by a suitable bracket 33 fixed to a cross piece 34 extending between the main bars 1.

My land roller is here shown as supporting a lawn mower 35 which is located directly in front of one of the driving rollers 2, and beneath the steering post 30 and the seat 31. Said mower is suitably suspended from one of the frame elements 6 and is shiftable toward and from the ground by a lever 36 arranged near the seat 31. The mower includes the usual rotating knife 37 preferably actuated by the motor 9. As here shown a shaft 38 extends in front of, and parallel to, the driving roller 2 farthest from the mower 35 and is provided at its opposite ends with pulleys or sprocket wheels 39, 40, one 39 being connected by a belt or chain 41 to a pulley or sprocket wheel mounted on the shaft for the knife 37, and the other 40 being connected by a belt or chain 42 to a pulley or sprocket wheel 43 mounted on the outer end of the axle for said driving roller 2 and within the contiguous frame element 6. Obviously, any other suitable power-transmitting means may be substituted for the various sprocket wheels and chains.

A land roller constructed as described is particularly strong and durable, is adapted for use on hilly or level ground, is easily controlled, and is particularly durable and efficient when used in connection with an implement, as a mower, since said mower is arranged in front of one of the driving rollers and directly under the eye of the operator.

Owing to the illustrated and described arrangement of the mower or implement and of the actuating mechanism for the mower knife or other movable element of an implement, the dragging resistance on one side of the machine due to the location of the implement is substantially offset by the driving of the mower knife from the axle of the roller on the other side of the machine, the location of the implement and the actuating mechanism for its movable element substantially equalizing the resistance on opposite sides of the differential gearing.

What I claim is:

1. A motor land roller comprising a frame, two driving rollers movable in parallel paths, a steering roller, a motor, an implement arranged adjacent to one of the driving rollers and including a movable part, power-transmitting means between the motor and the driving roller contiguous to the implement, power-transmitting means between the motor and the other driving roller and the movable part of the implement, and a differential gearing between said power-transmitting means, substantially as and for the purpose specified.

2. A motor land roller comprising a frame, two driving rollers arranged in axial alinement and having their opposing ends spaced apart, a steering roller arranged in front of the space between the driving rollers, a motor supported by the frame, power-transmitting connections between the motor and the axles for the driving rollers including a differential gearing, a mower arranged adjacent to one of the driving rollers and including a movable knife, and power-transmitting means between the knife and the axle for the other driving roller, substantially as and for the purpose described.

3. A motor land roller comprising a frame, two driving rollers arranged in axial alinement, and having their opposing ends spaced apart, a steering roller arranged opposite to the space between the driving rollers, a motor supported by the frame, power-transmitting connections between the motor and the axles of the driving rollers, including shafts connected respectively to the driving rollers, and a differential gearing connecting the shafts, an implement arranged in front of one of the driving rollers and including a movable part, means for actuating the movable part, such means being arranged to receive its power from the side of the differential gearing opposite to that side to which is connected the roller contiguous to such implement, substantially as and for the purpose described.

4. A motor land roller comprising a frame, two driving rollers arranged in axial alinement and having their opposing ends spaced apart, a steering roller arranged opposite the space between the opposing ends of the driving rollers, a motor, connections between the motor and the driving rollers including a differential gearing arranged between the rollers and connected to the inner ends of the axles of the rollers, a mower arranged adjacent to one of the driving rollers and including a movable knife, and means for actuating the knife comprising a shaft extending parallel to the axes of the rollers and connected at one end to the outer end of the axle for the other driving roller, substantially as and for the purpose set forth.

In testimony whereof, I have hereunto signed my name in the presence of two attesting witnesses, at Syracuse, in the county of Onondaga, in the State of New York, this 22nd day of September, 1909.

AURIN M. CHASE.

Witnesses:
S. DAVIS,
E. K. SUMILLER.